(12) United States Patent
Johannessen et al.

(10) Patent No.: US 12,709,394 B2
(45) Date of Patent: Aug. 18, 2026

(54) SYSTEMS AND METHODS FOR AUTOMATICALLY ADJUSTING SEAT SETTINGS

(71) Applicant: B/E AEROSPACE, INC., Winston-Salem, NC (US)

(72) Inventors: Eric Johannessen, Holbrook, NY (US); Sambasiva Rao Kodati, Hyderabad (IN); Mallikarjuna Reddy Guntapati, Hyderabad (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 216 days.

(21) Appl. No.: 18/598,850

(22) Filed: Mar. 7, 2024

(65) Prior Publication Data

US 2025/0197009 A1 Jun. 19, 2025

(30) Foreign Application Priority Data

Dec. 19, 2023 (IN) ............................. 202341086854

(51) Int. Cl.
*B64D 11/06* (2006.01)

(52) U.S. Cl.
CPC ................................ *B64D 11/0639* (2014.12)

(58) Field of Classification Search
CPC . B60N 2/0022; B60N 2/0024; B64D 11/0639
See application file for complete search history.

(56) References Cited

U.S. PATENT DOCUMENTS 10,414,502 B2 9/2019 Monfraix et al.
2009/0273213 A1* 11/2009 Mukherjee ....... B64D 11/06395 297/217.3
2012/0053794 A1 3/2012 Alcazar et al.
2016/0368509 A1 12/2016 Uppal
2018/0304773 A1 10/2018 Lerouge et al.
2021/0221517 A1* 7/2021 Guy ................... B64D 11/0639
2022/0031559 A1* 2/2022 Lee ........................ B60K 35/22
2022/0371477 A1 11/2022 Ben et al.
2023/0019157 A1 1/2023 Arunmozhi
2023/0166844 A1 6/2023 Vogel et al.
2023/0322389 A1 10/2023 Davis et al.

FOREIGN PATENT DOCUMENTS

CN 116039929 5/2023
GB 2563566 12/2018

OTHER PUBLICATIONS

European Patent Office, European Search Report dated Mar. 21, 2025 in Application No. 24220364.4.

* cited by examiner

*Primary Examiner* — Philip F Gabler
(74) *Attorney, Agent, or Firm* — SNELL & WILMER L.L.P.

(57) ABSTRACT

Systems and methods for automatically adjusting settings and positions of fully adjustable seats are disclosed herein. The method including receiving, by a processor, data from at least one sensor that is operatively coupled to the processor, the data including a representation of a size and a shape of a passenger, identifying, by the processor, at least one of the size or the shape of the passenger based on the data, determining, by the processor, at least one determined seat position for the adjustable seat based at least in part on one of the size or the shape of the passenger, and sending, by the processor, instructions to the adjustable seat to adjust the adjustable seat to a first determined seat position.

19 Claims, 5 Drawing Sheets

SYSTEMS AND METHODS FOR AUTOMATICALLY ADJUSTING SEAT SETTINGS

CROSS-REFERENCE TO RELATED APPLICATIONS

This application claims priority to, and the benefit of, India Provisional Patent Application No. 202341086854, filed Dec. 19, 2023 and titled "SYSTEMS AND METHODS FOR AUTOMATICALLY ADJUSTING SEAT SETTINGS," which is incorporated by reference herein in its entirety for all purposes.

FIELD

The present disclosure generally relates to seating and more particularly to adjustable aircraft seating.

BACKGROUND

Aircraft include a variety of seating options including fully adjustable seating options such as those found in business class, first class, and premium suites. Passengers of different sizes and shapes use the fully adjustable seats aboard aircraft. Some passengers, such as children, may not know how to adjust the seats properly to achieve comfort and/or safety for their size and shape. Some passengers do not want to press the buttons on the seat or learn how to use the different buttons to adjust the seat.

SUMMARY

Disclosed herein is a method for automatically adjusting an adjustable seat. The method includes receiving, by a processor, data from at least one sensor that is operatively coupled to the processor, the data including a representation of a size and a shape of a passenger, identifying, by the processor, at least one of the size or the shape of the passenger based on the data, determining, by the processor, at least one determined seat position for the adjustable seat based at least in part on one of the size or the shape of the passenger, and sending, by the processor, instructions to the adjustable seat to adjust the adjustable seat to a first determined seat position.

In various embodiments, the identifying at least one of the size or the shape of the passenger further includes identifying, by the processor, a plurality of physical points of the passenger, determining, by the processor, a distance between two physical points of the plurality of physical points of the passenger, and determining, by the processor, the at least one determined seat position based at least in part on the distance. In various embodiments, the plurality of physical points includes two or more of a shoulder, an elbow, a wrist, a head, a neck, a hip, a knee, or an ankle.

In various embodiments, the at least one determined seat position includes one of a taxi, takeoff, and landing seat position, a cruising lounge position, and a cruising recline position. In various embodiments, the method further includes sending, by the processor, instructions to the adjustable seat to adjust to taxi, takeoff, and landing (TTL) position in response to the passenger approaching the adjustable seat in an aircraft for a first time and sending, by the processor, instructions to the adjustable seat to adjust from the TTL position to a cruise altitude position in response to the aircraft reaching cruising altitude.

In various embodiments, the method further includes receiving, by the processor, user input to adjust the adjustable seat and determining, by the processor, a second determined seat position based at least in part on the first determined seat position and the user input.

In various embodiments, the at least one sensor includes one of an image sensor, a video sensor, an acoustic sensor, an ultrasonic sensor, or an infrared (IR) sensor.

Also disclosed herein is a system including an adjustable seat, a sensor, a processor operatively coupled to the sensor and the adjustable seat, and a memory operatively coupled to the processor. The memory includes instructions stored thereon that, when executed by the processor, cause the processor to receive data from the sensor, the data including a representation of a size and a shape of a passenger, identify at least one of the size or the shape of the passenger based on the data, determine a first determined seat position for the adjustable seat based at least in part on one of the size or the shape of the passenger, and send instructions to the adjustable seat to adjust the adjustable seat to the first determined seat position.

In various embodiments, the instructions, when executed by the processor, further cause the processor to identify a plurality of physical points of the passenger, determine a distance between two physical points of the plurality of physical points of the passenger, and determine the first determined seat position based at least in part on the distance. In various embodiments, the plurality of physical points includes two or more of a shoulder, an elbow, a wrist, a head, a neck, a hip, a knee, or an ankle.

In various embodiments, the instructions, when executed by the processor, further cause the processor to determine a second determined seat position for the adjustable seat based at least in part on one of the size or the shape of the passenger, wherein the second determined seat position is an aircraft cruising position and wherein the first determined seat position is a taxi, takeoff, and landing (TTL) position. In various embodiments, the instructions, when executed by the processor, further cause the processor to send instructions to the adjustable seat to the first determined seat position in response to the passenger approaching the adjustable seat in an aircraft for a first time and send instructions to the adjustable seat to adjust from the first determined seat position to the second determined seat position in response to the aircraft reaching cruising altitude.

In various embodiments, the instructions, when executed by the processor, further cause the processor to receive a user input to adjust the adjustable seat and determine a third determined position based at least in part on the first determined seat position and the user input. In various embodiments, the sensor includes at least one of an image sensor, a video sensor, an acoustic sensor, an ultrasonic sensor, or an infrared (IR) sensor.

Also disclosed herein is a method including retrieving, by a processor, from a server a first determined position of an adjustable seat for a passenger, the first determined position being associated with the passenger assigned to the adjustable seat, receiving, by the processor, data from at least one sensor of the passenger in response to the passenger approaching the adjustable seat, the at least one sensor being operatively coupled to the processor and the data including a representation of a size and a shape of the passenger, determining, by the processor, a second determined position based at least in part on the first determined position and at least one of the size or the shape of the passenger, and sending, by the processor, instructions to the adjustable seat to adjust the adjustable seat to the second determined position.

In various embodiments, the method further includes sending, by the processor, the second determined position to the server, the second determined position to be associated with the passenger. In various embodiments, the method further includes identifying, by the processor, a plurality of physical points of the passenger, determining, by the processor, a distance between two physical points of the plurality of physical points of the passenger, and determining, by the processor, the second determined position based at least in part on the distance.

In various embodiments, the plurality of physical points includes two or more of a shoulder, an elbow, a wrist, a head, a neck, a hip, a knee, or an ankle. In various embodiments, the method further includes receiving, by the processor, user input to adjust the adjustable seat and determining, by the processor, a third determined position based at least in part on the second determined position and the user input. In various embodiments, the method further includes sending, by the processor, the third determined position to the server, the third determined position to be associated with the passenger.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
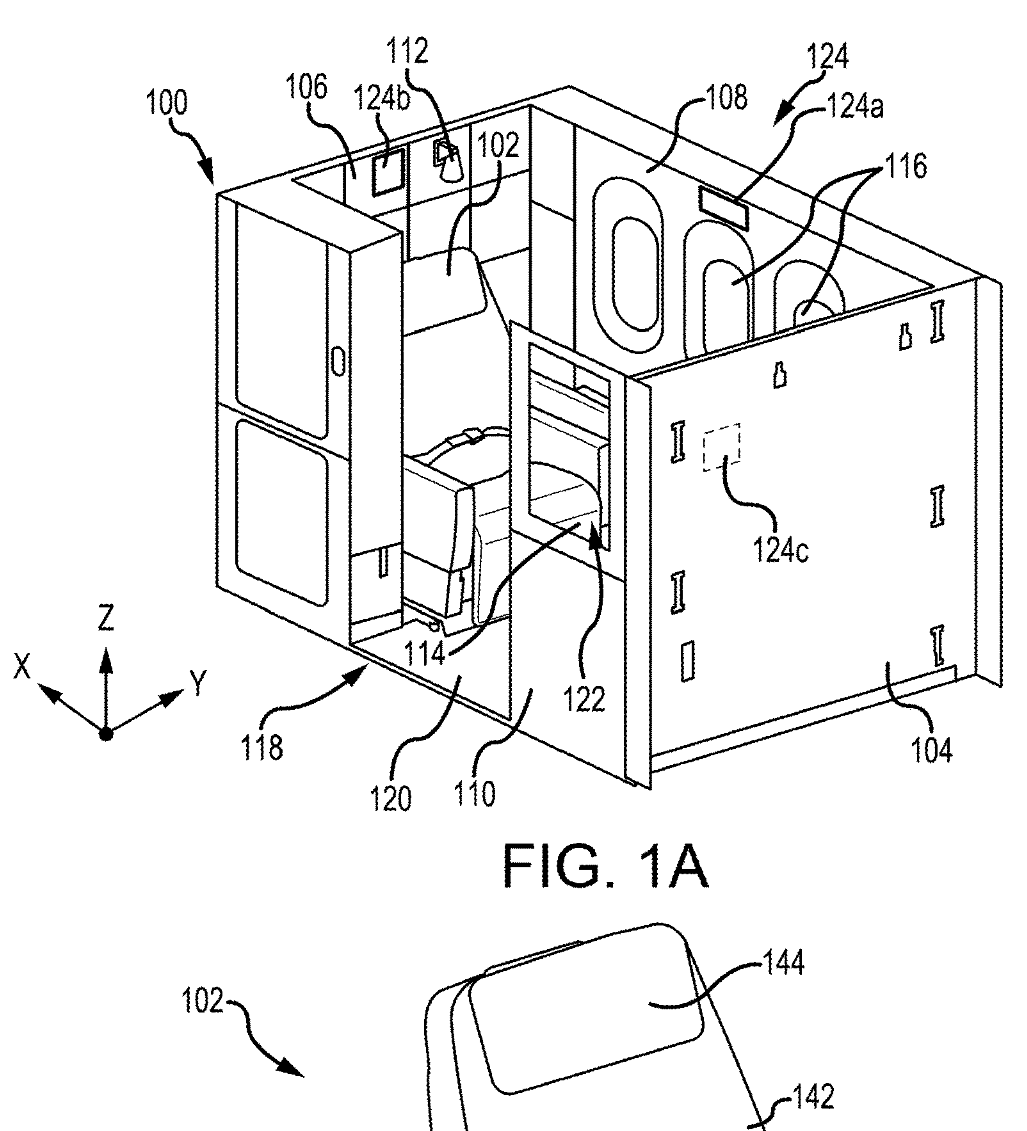
FIG. 1A illustrates a suite including a fully adjustable seat, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems and methods for automatically adjusting settings and positions of fully adjustable seats onboard an aircraft. In various embodiments, the fully adjustable seats may include actuators to move, or adjust, a headrest, armrests, a leg rest, and a seat pan, among other settings. In various embodiments, the system includes a sensor that detects a passenger and a controller for computing a size and shape of the passenger based data received from the sensor. In various embodiments, the sensor may include an image sensor, a video sensor, an infrared (IR) sensor, or other sensor array capable of detecting the size and shape of the passenger. In various embodiments, the controller may identify joints and different body dimensions based on the data received from the sensor. In various embodiments, the controller may determine determined settings for the seat based on the determined size and shape of the passenger and adjust the seat based on the determined settings. In various embodiments, the controller may determine determined settings for different modes including taxi, takeoff, and landing (TTL), in flight working, and/or in flight rest, among other modes.

In various embodiments, the controller may be a stand alone controller that is operatively coupled to the sensor and to the seat. In various embodiments, the controller may further be operatively coupled to a server that stores data related to the passenger. In various embodiments, the controller may retrieve settings for the passenger from the server and adjust the seat based on the retrieved settings. In various embodiments, the controller may adjust the retrieved settings based on the determined size and shape of the passenger in response to the determined size and shape of the passenger being different than previous settings.

Not all passengers are aware of the different seat adjustments or how to adjust the seat. Furthermore, not all passengers are aware of how to properly configure their seat to maximize safety during TTL and to maximize comfort during the flight. In various embodiments, automatically adjusting the seat settings based on the size and shape of the passenger tends to increase the comfort and safety of the passenger. While the system and methods described herein refer to aircraft seating, it should be understood and appreciated that these systems and methods may be used in different settings such as trains, cruise ships, automobiles, home, and hospitals, among others.

As described herein, size and shape of a passenger refers to the overall dimensions and body shape of the passenger. The shape of the passenger may refer to the general body shape of the passenger, such as for example, a rectangle, an inverted triangle, an hourglass, a pear, and an apple. A rectangle shaped passenger tends to have shoulders, waist, and hips that are about the same width. An inverted triangle shaped person tends to have shoulders that are wider than the waist which is wider than the hips. An hourglass shaped person tends to have shoulders and hips that are wider than the waist. A pear shaped person tends to have shoulders and waist that are narrower than the hips. An apple shaped person tends to have shoulders than are narrower than the waist and hips.

The size of the passenger includes the measurements of the passenger body and limbs. For example, the overall height of the passenger from head to tow, the overall width of the passenger at the shoulders and/or hips, the length of the neck, the length of the legs, the length of the torso, the length of the arms, the width of the shoulders, and the width of the hips, among others. As can be appreciated, and will be described in further detail below, the size of the passenger and the shape of the passenger may affect the comfort of the passenger when sitting. The size and shape of the passenger may also include general terms related to the build of a person such as ectomorph, endomorph, and mesomorph. Other terms that may be used are lean, slender, skinny, athletic, muscular, and fit, among others. Each of these terms may be further described by the measurements of the body as mentioned above.

Figure 1B:
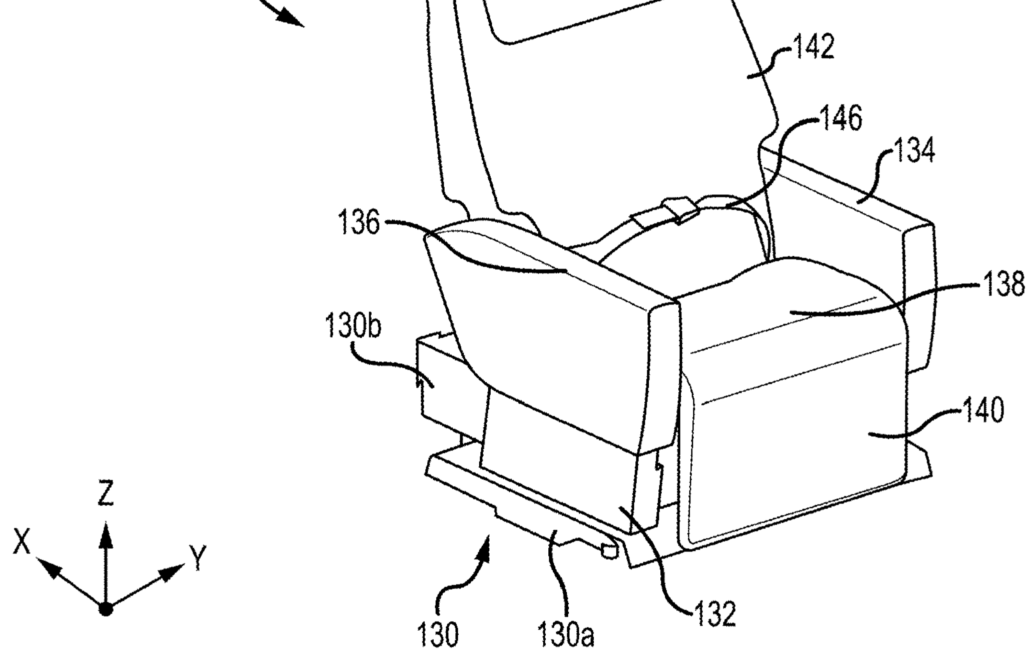
FIG. 1B illustrates a fully adjustable seat, in accordance with various embodiments.

Referring now to FIGS. 1A and 1B, illustrate a suite 100 including an adjustable seat 102, in accordance with various embodiments. FIG. 1A illustrates adjustable seat 102 inside of suite 100 and FIG. 1B illustrates adjustable seat 102 outside of suite 100. Suite 100 further includes a forward wall 104, an aft wall 106, an exterior wall 108, an interior wall 110, a light 112, a surface 114, one or more windows 116 disposed in exterior wall 108, a doorway 118 disposed in interior wall 110, and a floor 120. In various embodiments, suite 100 may further include an interior window 122 in interior wall 110. Suite 100 further includes one or more sensors 124 located in suite 100 and a controller operatively coupled to the one or more sensors 124 and adjustable seat 102.

The one or more sensors 124 may, in various embodiments, include an image sensor, a video sensor, an acoustic sensor, an ultrasonic sensor, and/or an infrared (IR) sensor, among others. In various embodiments, the one or more sensors 124 may be directed toward doorway and/or adjustable seat 102. In various embodiments, the one or more sensors 124 may be located on a wall opposite doorway 118 (e.g., sensor 124*a*). In various embodiments, the one or more sensors 124 may be located above adjustable seat 102 on aft wall 106 and facing forward wall 104 (e.g., sensor 124*b*). In various embodiments, the one or more sensors 124 may be located on forward wall 104 facing adjustable seat 102 and aft wall 106 (e.g., sensor 124*c*). In will be appreciated that these are exemplary locations of one or more sensors 124 and that the one or more sensors 124 may be located in various locations based on the design and layout of the area. The location of the one or more sensors 124 should provide the one or more sensors 124 sufficient view of the passenger to capture a general size and shape of the passenger.

Adjustable seat 102 may include a base 130, a seat base 132, a first armrest 134, a second armrest 136, a seat pan 138, a leg rest 140, a backrest 142, a headrest 144, and a seatbelt 146. Adjustable seat 102 further includes a plurality of actuators including at least one actuator (e.g., a motor) for one or more of seat base 132, first armrest 134, second armrest 136, seat pan 138, leg rest 140, backrest 142, and/or headrest 144. In various embodiments, one or more of these components may not be include an actuator and may not be adjustable in adjustable seat 102. In various embodiments, the controller may be operatively coupled to the plurality of actuators in adjustable seat 102. In various embodiments, the controller may be in base 130, seat base 132, or suite 100. Additionally, suite 100 and/or adjustable seat 102 may include controls for activating the plurality of actuators including touch screen controls, a remote control, and/or buttons, among other types of controls.

Base 130 includes a lower portion 130*a* that is coupled to floor 120 (e.g., bolted) and an upper portion 130*b* that is configured to engage seat base 132. Seat base 132 is configured engage upper portion 130*b* to move forward (e.g., in the negative x-direction) and aft (e.g., in the positive x-direction). First armrest 134 and second armrest 136 are coupled to seat base 132 and extend up (e.g., in the positive z-direction) from seat base 132. Seat pan 138 is coupled to seat base 132 and extends horizontally (e.g., in the x-y plane) between first armrest 134 and second armrest 136. In various embodiments, seat pan 138 may be configured to move forward (e.g., in the negative x-direction) and aft (e.g., in the positive x-direction) with respect to seat base 132.

Leg rest 140 coupled to a forward portion (e.g., in the negative x-direction) of seat pan 138 and extends downward (e.g., in the negative z-direction) from seat pan 138. Leg rest 140 is configured to rotate forward (e.g., in the negative x-direction) from a vertical position (e.g., in the z-y plane) to a horizontal position (e.g., in the x-y plane). Backrest 142 is coupled to an aft portion (e.g., in the positive x-direction) of seat pan 138 and extends upward (e.g., in the positive z-direction) from seat pan 138. Backrest 142 is configured to rotate backward (e.g., in the positive x-direction) from a vertical position (e.g., in the z-y plane) to a horizontal position (e.g., in the x-y plane). Headrest 144 is coupled to a top portion (e.g., in the positive z-direction) of backrest 142. Headrest 144 is configured to move up and down (e.g., along the z-axis) with respect to backrest 142. In other words, headrest 144 is configured to move along backrest 142 toward and away from seat pan 138.

Additional seat adjustments may possible. In various embodiments, first armrest 134 and second armrest 136 may move laterally (e.g., along the y-axis) to accommodate larger or smaller passengers. In various embodiments, first armrest 134 and second armrest 136 may move vertically (e.g., along the z-axis) with respect to seat pan 138. In various embodiments, seat pan 138 may move vertically (e.g., along the z-axis) with respect to base 130 and floor 120. In various embodiments, headrest 144 may be further configured to move away from and toward backrest 142. In various embodiments, adjustable seat 102 may be configured to move vertically up and down (e.g., along the z-axis) to adjust a height of adjustable seat 102. These are intended to exemplary and not limiting as other adjustments may be possible depending on the design and configuration of adjustable seat 102.

The controller may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. The controller may further comprise memory to store data, executable instructions, system program instructions, and/or controller instructions to implement the control logic of the controller.

Figures 2A, 2B:
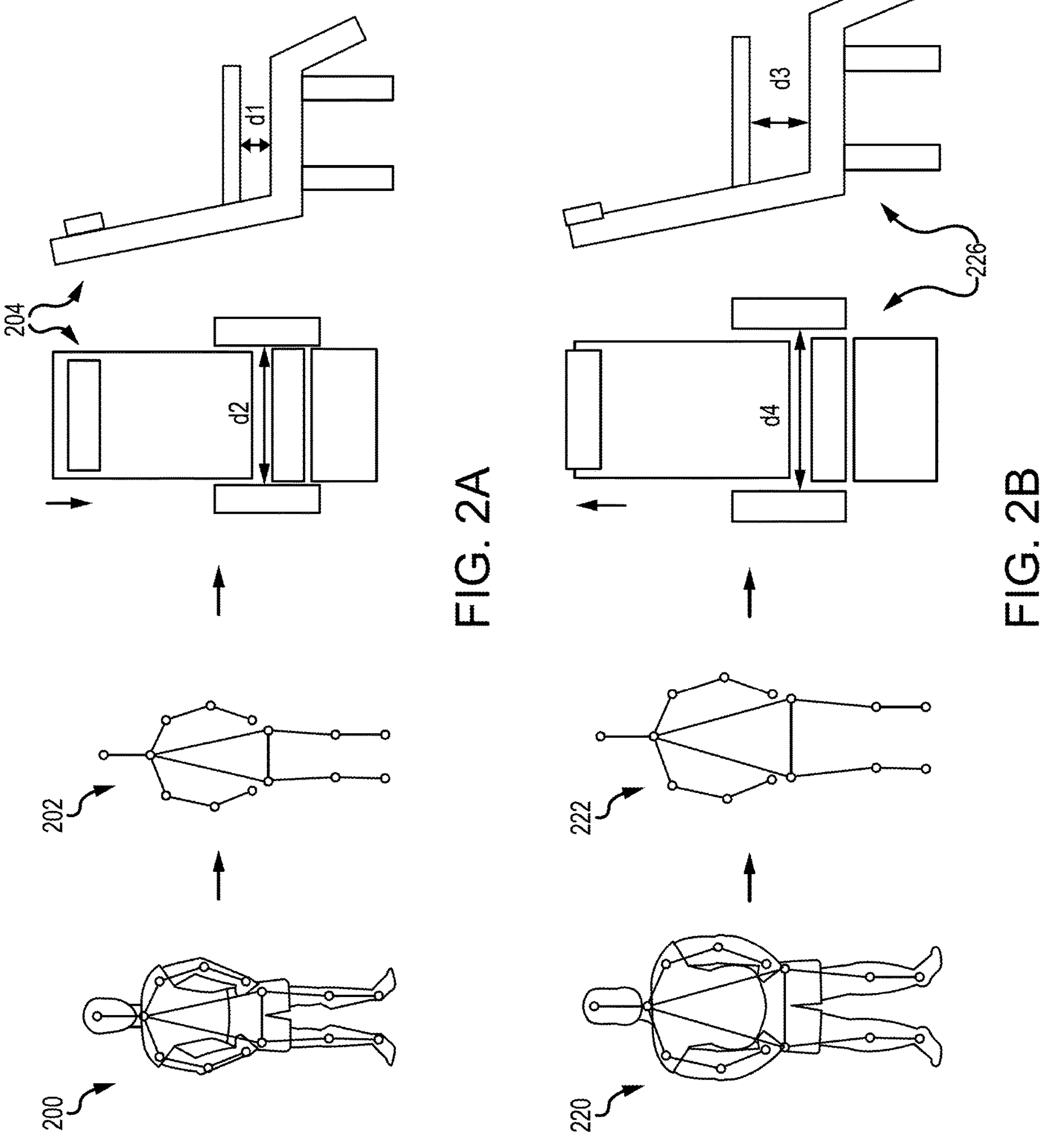
FIGS. 2A and 2B illustrate seat configurations for an adjustable seat based on passenger size and shape, in accordance with various embodiments.

Referring now to FIGS. 2A and 2B, a first passenger 200 and a second passenger 220 are illustrated, in accordance with various embodiments. FIG. 2A illustrates first passenger 200, a first body type 202, and a first configuration 204 of adjustable seat 102. FIG. 2B illustrates second passenger 220, a second body type 222, and a second configuration 226 of adjustable seat 102. Based on data received from the one or more sensors 124, the controller determines that first passenger 200 has first body type 202 and that second passenger 220 has second body type 222, where second body type 222 is larger in at least one dimension than first body type 202. That is, second passenger 220 has a larger size and shape than first passenger 200. The controller, as will be described in more detail further below, adjusts adjustable seat 102 in response to determining the size and shape of a particular passenger (e.g., first passenger 200 or second passenger 220).

Referring first to FIG. 2A, first configuration 204 illustrates a first seat configuration for adjustable seat 102. The controller activates the plurality of actuators to move adjustable seat 102 to first configuration 204 including moving first armrest 134 and second armrest 136 to a first position that is a first distance d1 above seat pan 138 and a second distance d2 apart from each other. The controller further actuates the plurality of actuators to move headrest 144 toward seat pan 138.

Referring now to FIG. 2B, second configuration 226 illustrates a second seat configuration for adjustable seat 102. The controller activates the plurality of actuators to move adjustable seat 102 to second configuration 226 including moving first armrest 134 and second armrest 136 to a second position that is a third distance d3 above seat pan 138 and a fourth distance d4 apart from each other. Third distance d3 is greater and first distance d1 and fourth distance d4 is greater than second distance d2. The controller further actuates the plurality of actuators to move headrest 144 away from seat pan 138. Second configuration 226 is better suited for second passenger 220 who is larger than first passenger 200. Armrests 134, 136 being in the second position provides additional lateral space for the hips of second passenger 220 and less vertical space between the elbows of second passenger 220 when in the seated position.

Figure 3:
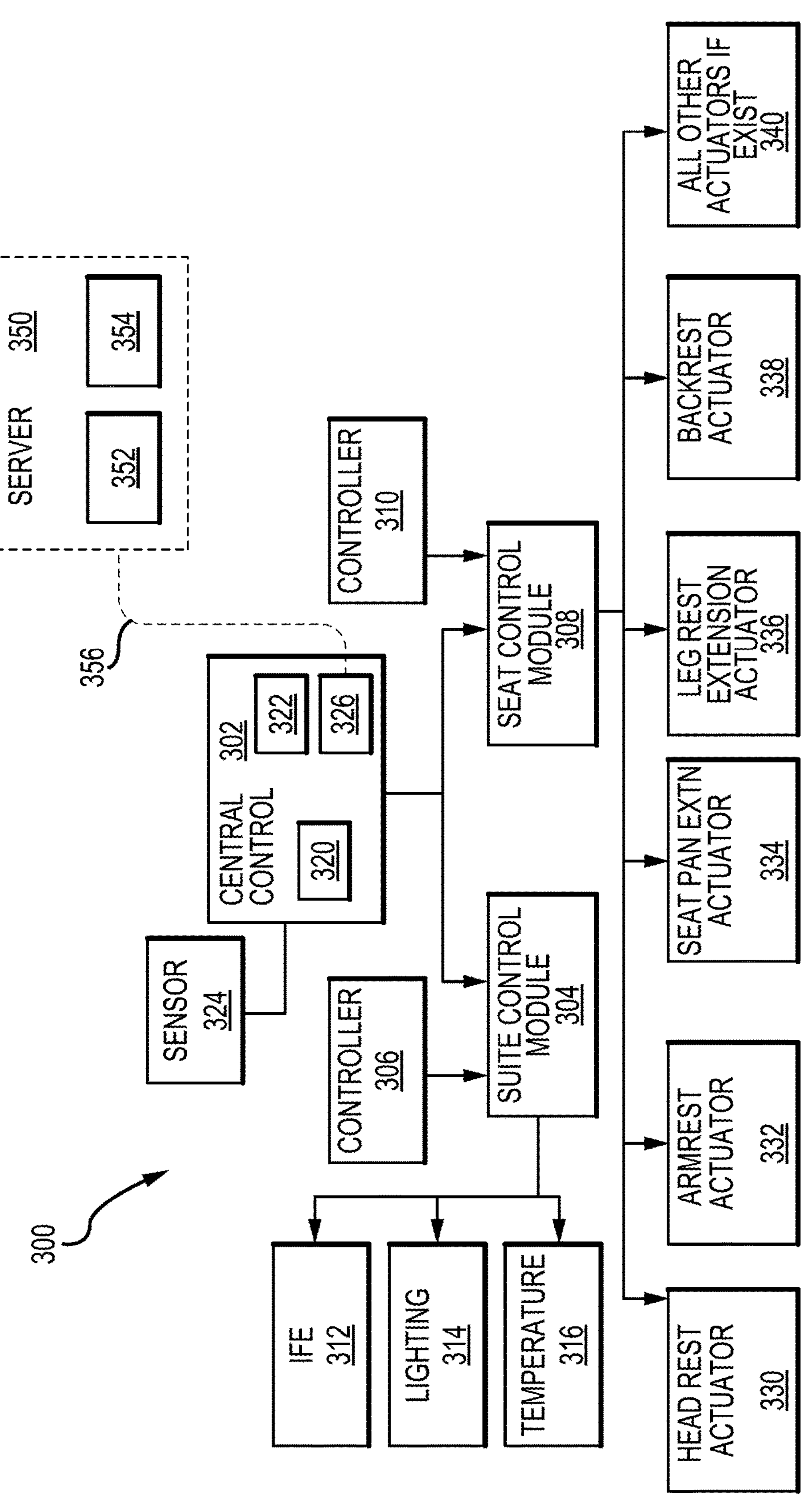
FIG. 3 illustrates a system for automatically adjusting an adjustable seat based on the size and shape of a passenger, in accordance with various embodiments.

Referring now to FIG. 3, a system 300 for use with adjustable seat 102 and suite 100 is illustrated, in accordance with various embodiments. System 300 includes a central control module 302, a suite control module 304, a manual suite controller 306, a seat control module 308, and a manual seat controller 310. Central control module 302 is operatively coupled to, and configured to communicate with, suite control module 304 and seat control module 308. That is, central control module 302 is able to send commands to, and receive status from, suite control module 304 and seat control module 308.

Suite control module 304 controls different systems in a suite (e.g., suite 100) including an inflight entertainment system 312, a lighting system 314, and a temperature system 316, among others. Manual suite controller 306 is operatively coupled to suite control module 304 and is configured to control the different systems of the suite including inflight entertainment system 312, lighting system 314, and temperature system 316, among others. In various embodiments, manual suite controller 306 may include buttons, or switches, in a fixed location in the suite, a hand held controller having buttons, and/or software run on inflight entertainment system 312, among others.

Seat control module 308 controls different actuators of an adjustable seat (e.g., adjustable seat 102) including a headrest actuator 330, armrest actuators 332, a seat pan actuator 334, a leg rest actuator 336, a backrest actuator 338, and other actuators 340 as previously described above in FIGS. 1A and 1B. Manual seat controller 310 is operatively coupled to seat control module 308 and is configured to control headrest actuator 330, armrest actuators 332, seat pan actuator 334, leg rest actuator 336, backrest actuator 338, and other actuators 340. In various embodiments, manual seat controller 310 may include buttons, or switches, in a fixed location in the suite, a hand held controller having buttons, and/or software run on inflight entertainment system 312, among others.

Central control module 302 includes a processor 320, memory 322, and one or more sensors 324. The one or more sensors 324 may be examples of the sensor 124 described above in FIGS. 1A and 1B, including, an image sensor, a video sensor, acoustic sensor, ultrasonic sensor, and/or an infrared (IR) sensor, among others. The one or more sensors 324 may be placed near and/or around the adjustable seat (e.g., adjustable seat 102) as previously described. The one or more sensors 324 are operatively coupled to processor 320 and are configured to send data to processor 320. Memory 322 is operatively coupled to processor 320 and is configured to store data and software code for use by processor 320.

Processor 320 may comprise one or more processors configured to implement various logical operations in response to execution of instructions, for example, instructions stored on a non-transitory, tangible, computer-readable medium. The one or more processors can be a processing chip, a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Memory 322 may comprise memory to store data, executable instructions, system program instructions, and/or controller instructions to implement the control logic of processor 320.

Figure 4:
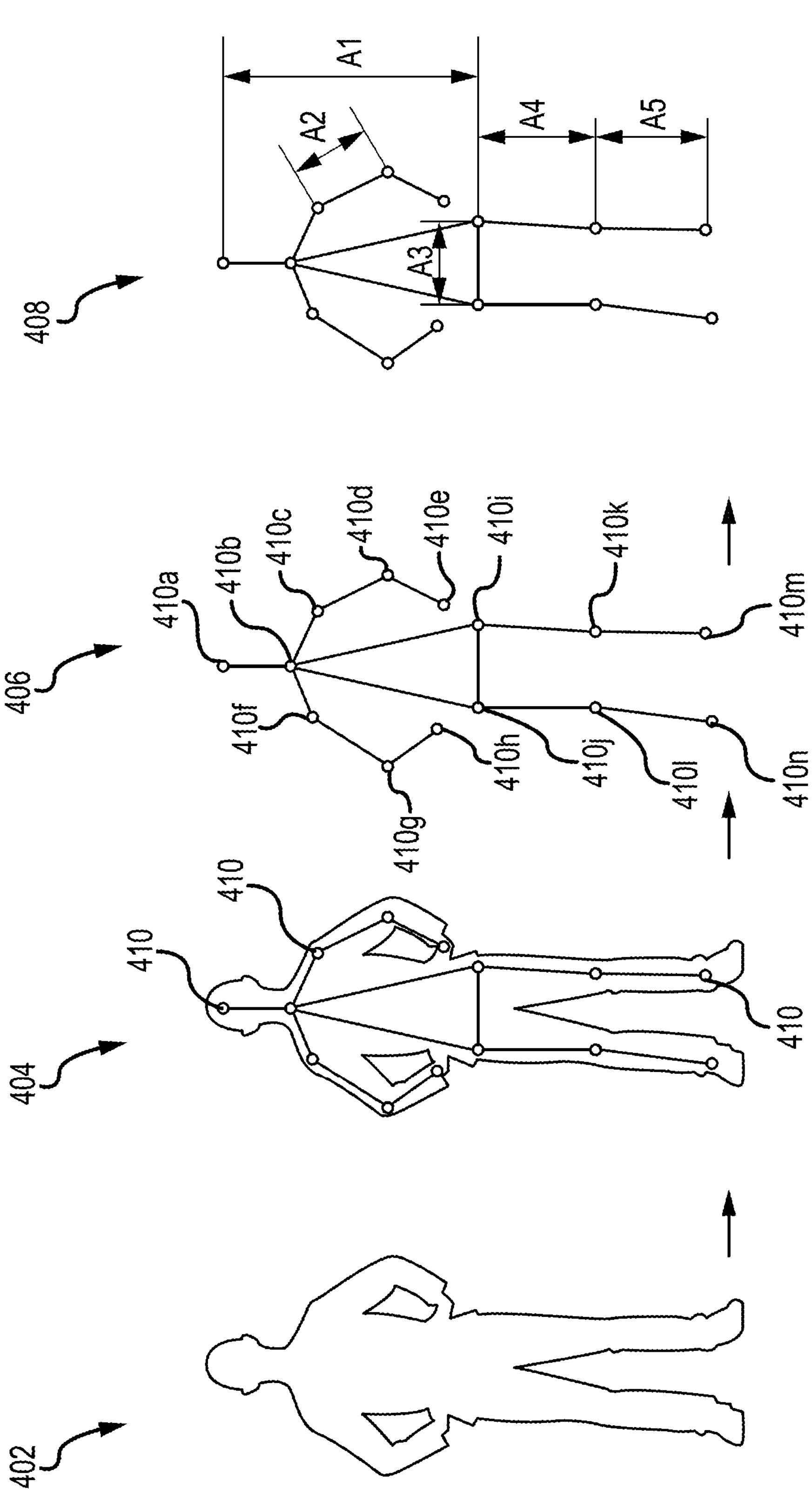
FIG. 4 illustrates processing steps used by a system for automatically adjusting an adjustable seat, in accordance with various embodiments.

Processor 320 is configured to receive data from the one or more sensors 324 and to determine the size and shape of a passenger based on the received data. Referring momentarily to FIG. 4, different processing steps for determining the size and shape of the passenger are illustrated, in accordance with various embodiments. Processor 320 determines a first view 402 of the passenger, alternatively referred to as a sensor view, based on the data received from the one or more sensors 324. First view 402 is a general outline of the passenger. Processor 320 processes the data of first view 402 to determine a second view 404, alternatively referred to as a joint view. Second view 404 determines locations of various physical points 410 based on first view 402, the general outline of the passenger.

Based on the determined location of physical points 410, processor 320 determines a third view 406, alternatively referred to as a skeleton view. Third view 406 is a simplified view of the passenger in which physical points 410 are connected to one another. The number of physical points 410 identified by processor 320 may vary depending on how many adjustment points are included in the adjustable chair (e.g., adjustable seat 102). As illustrated in third view 406, processor 320 identifies a head 410*a*, a neck 410*b*, a left shoulder 410*c*, a left elbow 410*d*, a left wrist 410*e*, a right shoulder 410*f*, a right elbow 410*g*, a right wrist 410*h*, a left hip 410*i*, a right hip 410*j*, a left knee 410*k*, a right knee 410*l*, a left ankle 410*m*, and a right ankle 410*n*.

Processor 320 determines distances between each physical point 410, as illustrated in a fourth view 408, using the simplified third view 406. That is, processor 320 determines a first distance A1 that extends from left hip 410*i* (or right hip 410*j*) to head 410*a*; a second distance A2 that extends from left elbow 410*d* to left shoulder 410*c*, or alternatively, from right elbow 410*g* to right shoulder 410*f*; a third distance A3 that extends from left hip 410*i* to right hip 410*j*; a fourth distance A4 that extends from left knee 410*k* to left hip 410*i*, or alternatively, from right knee 410*l* to right hip 410*j*; and a fifth distance A5 that extends from left ankle 410*m* to left knee 410*k*, or alternatively, from right ankle 410*n* to right knee 410*l*. While these measurements are possible for healthy individuals, processor 320 is further configured to determine the different distances between physical points 410 for passengers that are missing limbs, have limb differences, or have other physical attributes.

Returning to FIG. 3, processor 320 determines a determined position for the adjustable seat (e.g., adjustable seat 102) based on the body measurements including distances A1-A5. As previously described, processor 320 determines a determined position for the passenger's safety and comfort. In various embodiments, processor 320 determines a determined taxi, takeoff, and landing (TTOL) position, a determined recline position, and/or a determined lounge position, among others. Processor 320 sends commands to seat control module 308 to adjust the adjustable seat based on the determined position and the state of the aircraft. The aircraft may be in a TTL state or a cruise state. During TTL, processor 320 sends commands to seat control module 308 to move the adjustable seat to the TTL position for the safety of the passenger. During cruise, processor 320, in various embodiments, sends commands to seat control module 308 to move the adjustable seat to the lounge position. The passenger may use manual seat controller 310 to move the adjustable seat to the recline position with a single input.

In various embodiments, processor 320 may send commands to seat control module 308 to adjust headrest actuator 330 based on first distance A1. In various embodiments, processor 320 may send commands to seat control module 308 to adjust armrest actuators 332 based on second distance A2 and third distance A3. In various embodiments, processor 320 may send commands to seat control module 308 to adjust seat pan actuator 334 based on fourth distance A4. In various embodiments, processor 320 may send commands to seat control module 308 to adjust leg rest actuator 336 based on fifth distance A5. In various embodiments, processor 320 may send commands to seat control module 308 to adjust backrest actuator 338 based on the state of the aircraft (e.g., TTL or cruising). In various embodiments, processor 320 may send commands to seat control module 308 to adjust the adjustable seat to a zero gravity position (e.g., reclined with legs elevated) based on distances A1-A5.

In various embodiments, central control module 302 may be self contained in that the determined positions are determined solely based on the data received from the one or more sensors 324. In various embodiments, central control module 302 may be self contained in that central control module 302 will provide the same settings for all passengers having similar shapes and sizes (e.g., distances A1-A5). In various embodiments, central control module 302 may receive feedback from the passenger inputs and learn from adjustments that are made by the passenger. For example, the passenger may adjust the position of the adjustable seat after central control module 302 sends commands to move the adjustable seat to the determined position. Central control module 302, and more specifically processor 320 and memory 322, may incorporate those changes to adjust the settings for future passengers that have a similar shape and size. In various embodiments, this may result in central control module 302 providing different settings for the adjustable seat in different regions of the world based on passenger feedback. In various embodiments, these differences may be due to customs around the world or other factors.

In various embodiments, the adjustable seat may further include haptic feedback (e.g., vibrators). Central control module 302 may activate the haptics to alert the passenger that the adjustable seat is about to move to a different position (e.g., from cruise to TTOL position or from TTOL to cruise position). In various embodiments, central control module 302 may send a message for display on inflight entertainment system 312 to alert the passenger that the adjustable seat is about to move to a different position.

In various embodiments, central control module 302 may further include a network interface 326. In various embodiments, network interface 326 may include an IEEE 802.11 interface (Wi-Fi), an IEEE 802.3 interface (ethernet), an IEEE 802.15.1 interface (Bluetooth), and/or an IEEE 802.15.4 interface (ZigBee), among others.

System 300 may further include a server 350 having a processor 352 and a memory 354 that is configured to communicate with network interface 326 via a connection 356. In various embodiments, server 350 may include one or more servers located on the aircraft and/or located in a ground based location. In various embodiments, server 350 may be integrated with other automated systems to store, update, and retrieve passenger preferences.

In various embodiments, processor 320 may communicate with server 350 to store and/or retrieve passenger preferences. In various embodiments, the passenger preferences may include information about positions for the adjustable seat. In various embodiments, central control module 302 may receive an identifier for a passenger, request suite and seat settings from server 350, and adjust the suite and seat settings based on the received settings. In various embodiments, central control module 302 may adjust the received settings based on data received from the one or more sensors 324.

Processor 352 may comprise one or more processors configured to implement various logical operations in response to execution of instructions, for example, instructions stored on a non-transitory, tangible, computer-readable medium. The one or more processors can be a processing chip, a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 354 may further comprise memory to store data, executable instructions, system program instructions, and/or controller instructions to implement the control logic of processor 352.

Figure 5:
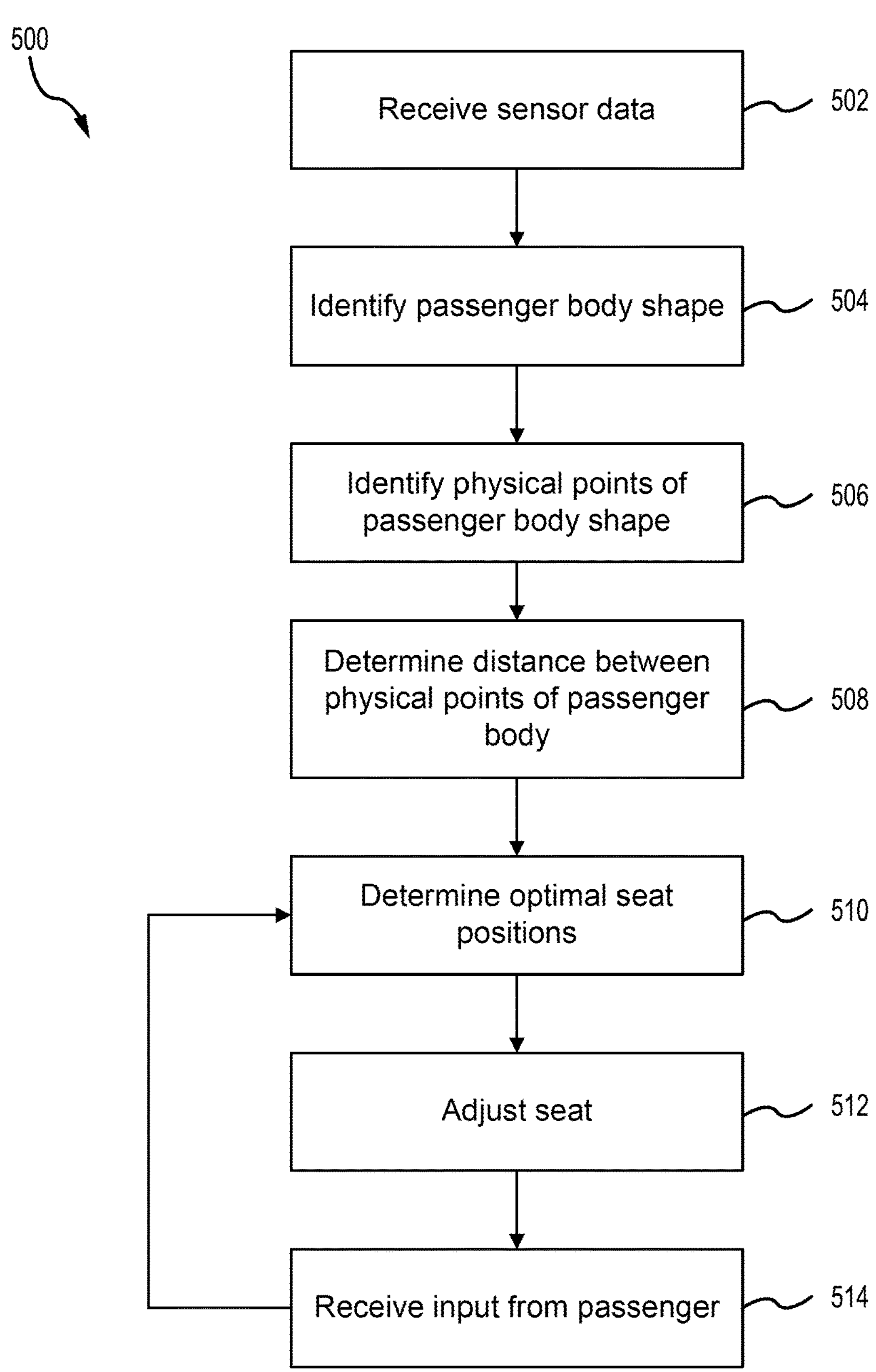
FIG. 5 illustrates a flow diagram of a method for automatically adjusting an adjustable seat, in accordance with various embodiments.

Referring now to FIG. 5, a flow diagram of a method 500 for determining a shape and size of a passenger and adjusting a seat in response to the determined shape and size is illustrated, in accordance with various embodiments. In various embodiments, the steps of method 500 may be performed by central control module 302 described above in FIG. 3. In various embodiments, the steps of method 500 may be performed by the controller described above in FIGS. 1A and 1B. In various embodiments, artificial intelligence and/or machine learning models may be used for performing one or more of the steps of method 500.

At block 502, a processor (e.g., processor 320) receives data from one or more sensors. In various embodiments, the one or more sensors may be examples of sensors 124 described above in FIGS. 1A and 1B. In various embodiments, the one or more sensors may be examples of the one or more sensors 324 described above in FIG. 5.

At block 504, processor 320 identifies a general body shape of a passenger based on the received sensor data. In various embodiments, identifying the general body shape may include the outline of the passenger body from one or more angles based on the received sensor data.

At block 506, processor 320 identifies physical points in the general body shape of the passenger. In various embodiments, the physical points may be associated with the head, the shoulders, the elbows, the wrists, the hips, the knees, and/or the ankles of the passenger. In various embodiments, identifying the physical points may include estimating a location of each physical point based on the general shape of the passenger and the received sensor data.

At block 508, processor 320 determines distances between each of the identified physical points. In various embodiments, processor 320 determines distances between each and every physical point. In various embodiments, processor 320 determines distances between one or more pairs of physical points. In various embodiments, the determining may include estimating the distance between two or more points.

At block 510, processor 320 determines one or more determined seat positions based on the one or more distances determined at block 508. In various embodiments, processor 320 determines a determined taxi, takeoff, and landing (TTL) position. In various embodiments, processor 320 determines a determined cruising position. In various embodiments, the determined cruising position may include a lounge position, a seated position, and/or a reclining position.

At block 512, processor 320 sends commands to adjust the seat to the determined position. In various embodiments, processor 320 sends commands to change the position of the seat for TTL and for cruising. In various embodiments, processors 320 sends an indication (e.g., haptic or visual) to the passenger indicating that the seat is going to move.

At block 514, processor 320 receives input from the passenger. In various embodiments, the input includes manual adjustments made to the seat via user controls. In various embodiments, the adjustments are made from a button on the seat. Method 500 then returns to block 510 to determine a determined seat position based on the sensor data and the passenger adjusts.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Furthermore, any reference to singular includes plural embodiments, and any reference to more than one component may include a singular embodiment. Use of 'a' or 'an' before a noun naming an object shall indicate that the phrase be construed to mean 'one or more' unless the context sufficiently indicates otherwise, as set forth in Slip op. at 8-9 (Fed. Cir. Oct. 19, 2023) (citing *Baldwin Graphic Sys., Inc. v. Siebert, Inc.,* 512 F.3d 1338, 1342-43 (Fed. Cir. 2008)). For example, the description or claims may refer to a processor for convenience, but the invention and claim scope contemplates that the processor may be multiple processors. The multiple processors may handle separate tasks or combine to handle certain tasks. Although specific advantages have been enumerated herein, various embodiments may include some, none, or all of the enumerated advantages. A "processor" may include hardware that runs the computer program code. Specifically, the term 'processor' may be synonymous with terms like controller and computer and should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system, comprising:

an adjustable seat;

a sensor;

a processor operatively coupled to the sensor and the adjustable seat; and a memory operatively coupled to the processor, the memory comprising instructions stored thereon that, when executed by the processor, cause the processor to:

receive data from the sensor, the data including a representation of a size and a shape of a passenger;

identify at least one of the size or the shape of the passenger based on the data, wherein identifying the at least one of the size or the shape of the passenger comprises:

determining a general outline of the passenger;

determining a plurality of physical points of the passenger based on the general outline of the passenger, the plurality of physical points including a head, a neck, a left shoulder, a left elbow, a left wrist, a right shoulder, a right elbow, a right wrist, a left hip, a right hip, a left knee, a right knee, a left ankle, and a right ankle of the passenger;

determining a set of distances between various ones of the plurality of physical points, wherein the set of distances includes:

a first distance that extends from at least one of the left hip or the right hip to the head;

a second distance that extends from at least one of the left elbow to the left shoulder or the right elbow to the right shoulder;

a third distance that extends from the left hip to the right hip;

a fourth distance that extends from at least one of the left knee to the left hip or the right knee to the right hip; and a fifth distance that extends from at least one of the left ankle to the left knee or the right ankle to the right knee;

determine a first determined seat position for the adjustable seat based at least in part on one of the size or the shape of the passenger; and send instructions to the adjustable seat to adjust the adjustable seat to the first determined seat position.

2. The system of claim 1, wherein the instructions, when executed by the processor, further cause the processor to:

determine the first determined seat position based at least in part on the distance.

3. The system of claim 2, wherein the instructions, when executed by the processor, further cause the processor to:

determine a first view of the passenger comprising the general outline of the passenger based on the data from the sensor;

determine a second view comprising locations of the plurality of physical points based on the first view;

determine a third view comprising a simplified view of the passenger in which the plurality of physical points are connected to one another; and determine distances between the plurality of physical points based on the third view.

4. The system of claim 2, wherein the instructions, when executed by the processor, further cause the processor to adjust the adjustable seat to a zero gravity position comprising the adjustable seat reclined with a leg rest elevated, based on the distance.

5. The system of claim 1, wherein the instructions, when executed by the processor, further cause the processor to:
determine a second determined seat position for the adjustable seat based at least in part on one of the size or the shape of the passenger, wherein the second determined seat position is an aircraft cruising position including one of a lounge position, a seated position, or a reclining position, and wherein the first determined seat position is a taxi, takeoff, and landing (TTL) position.

6. The system of claim 5, wherein the instructions, when executed by the processor, further cause the processor to:
send instructions to the adjustable seat to adjust to the first determined seat position in response to the passenger approaching the adjustable seat in an aircraft for a first time; and
send instructions to the adjustable seat to adjust from the first determined seat position to the second determined seat position in response to the aircraft reaching cruising altitude.

7. The system of claim 5, wherein the instructions, when executed by the processor, further cause the processor to:
receive a user input to adjust the adjustable seat; and
determine a third determined seat position based at least in part on the second determined seat position and the user input; and
send instructions to the adjustable seat to adjust to the third determined seat position.

8. The system of claim 7, wherein the instructions, when executed by the processor, further cause the processor to:
receive feedback from the passenger comprising adjustments made to the adjustable seat after the adjustable seat is adjusted to the first determined seat position; and
incorporate the adjustments to modify settings for future passengers having a similar size and shape.

9. The system of claim 1, wherein the sensor includes at least one of an image sensor, a video sensor, an acoustic sensor, an ultrasonic sensor, or an infrared (IR) sensor.

10. The system of claim 9, further comprising a suite having a doorway, wherein the sensor is located on a wall opposite the doorway.

11. The system of claim 1, wherein the adjustable seat comprises a base, a seat base, a first armrest, a second armrest, a seat pan, a leg rest, a backrest, a headrest, and a seatbelt, and wherein the adjustable seat further comprises a plurality of actuators including a headrest actuator, armrest actuators, a seat pan actuator, a leg rest actuator, and a backrest actuator, and wherein the processor is operatively coupled to the plurality of actuators.

12. The system of claim 11, wherein the instructions, when executed by the processor, further cause the processor to:
send instructions to adjust the headrest actuator based on a first distance extending from at least one of the left hip or the right hip to the head of the passenger;
send instructions to adjust the armrest actuators based on a second distance extending from at least one of the left elbow to the left shoulder or the right elbow to the right shoulder of the passenger and a third distance extending from the left hip to the right hip of the passenger;
send instructions to adjust the seat pan actuator based on a fourth distance extending from at least one of the left knee to the left hip or the right knee to the right hip of the passenger; and
send instructions to adjust the leg rest actuator based on a fifth distance extending from at least one of the left ankle to the left knee or the right ankle to the right knee of the passenger.

13. The system of claim 1, wherein the identifying at least one of the size or the shape of the passenger comprises categorizing the shape of the passenger into one of a rectangle, an inverted triangle, an hourglass, a pear, or an apple body shape.

14. The system of claim 1, further comprising:
a central control module comprising the processor and the memory;
a suite control module operatively coupled to the central control module and configured to control an inflight entertainment system, a lighting system, and a temperature system; and
a seat control module operatively coupled to the central control module and the adjustable seat.

15. The system of claim 1, further comprising a server having a server processor and a server memory, and a network interface operatively coupled to the processor and configured to communicate with the server, wherein the instructions, when executed by the processor, further cause the processor to:
receive an identifier for the passenger;
request seat settings from the server based on the identifier; and
adjust the first determined seat position based on the seat settings received from the server and the data from the sensor.

16. The system of claim 15, wherein the network interface includes at least one of an IEEE 802.11 interface, an IEEE 802.3 interface, an IEEE 802.15.1 interface, or an IEEE 802.15.4 interface.

17. The system of claim 1, further comprising an inflight entertainment system and haptic feedback on the adjustable seat, wherein the instructions, when executed by the processor, further cause the processor to activate the haptic feedback or send a message for display on the inflight entertainment system to alert the passenger that the adjustable seat is about to move to a different position.

18. The system of claim 1, further comprising a manual seat controller, wherein the manual seat controller is configured to move the adjustable seat to a recline position with a single input.

19. The system of claim 1, wherein one or more of the identifying at least one of the size or the shape, the determining the first determined seat position, or the sending instructions is performed using artificial intelligence or a machine learning model.

* * * * *